No. 819,511. PATENTED MAY 1, 1906.
G. D. BUCHANAN.
BRAKE MECHANISM FOR VEHICLES.
APPLICATION FILED JAN. 27, 1905.

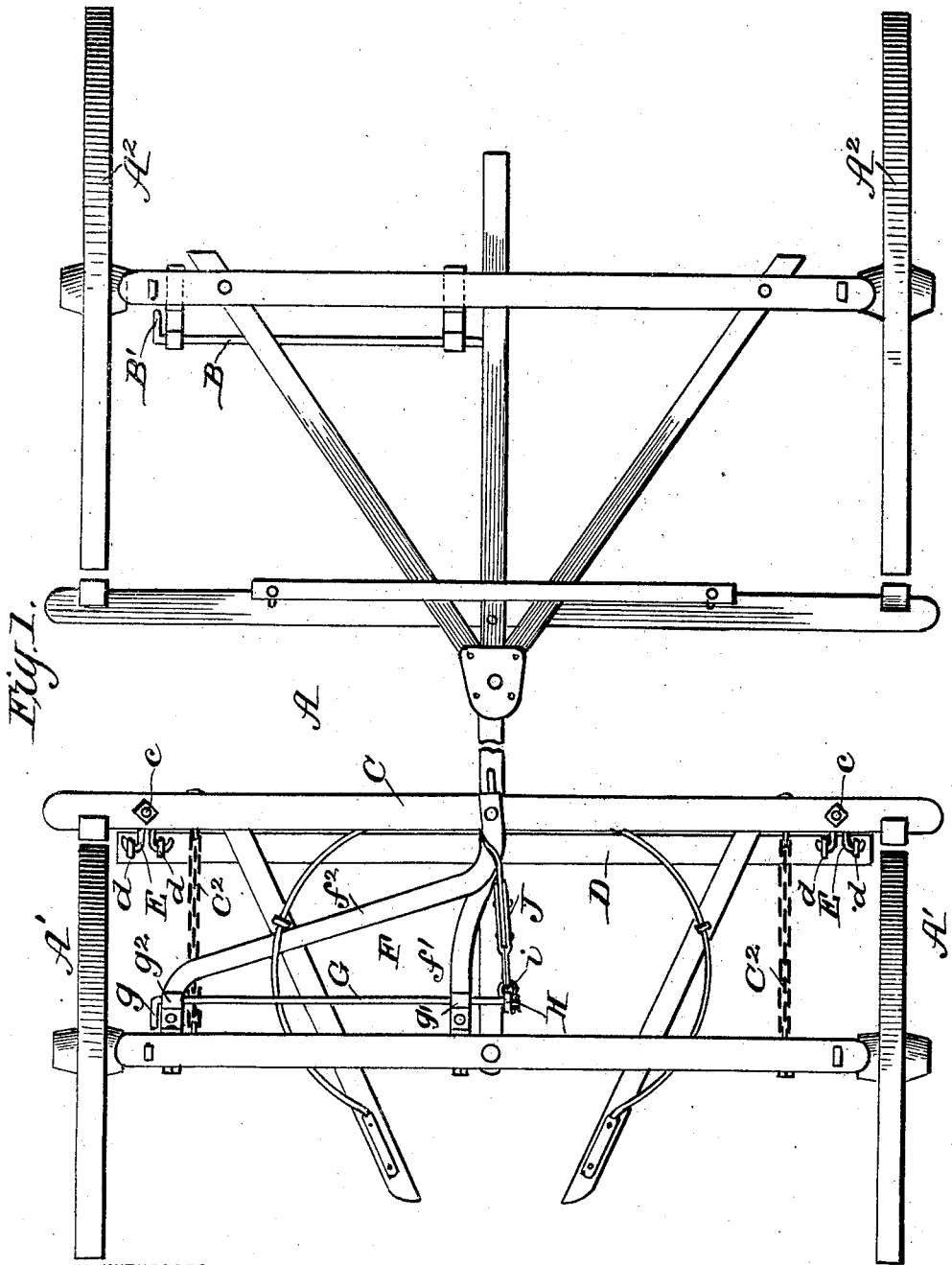

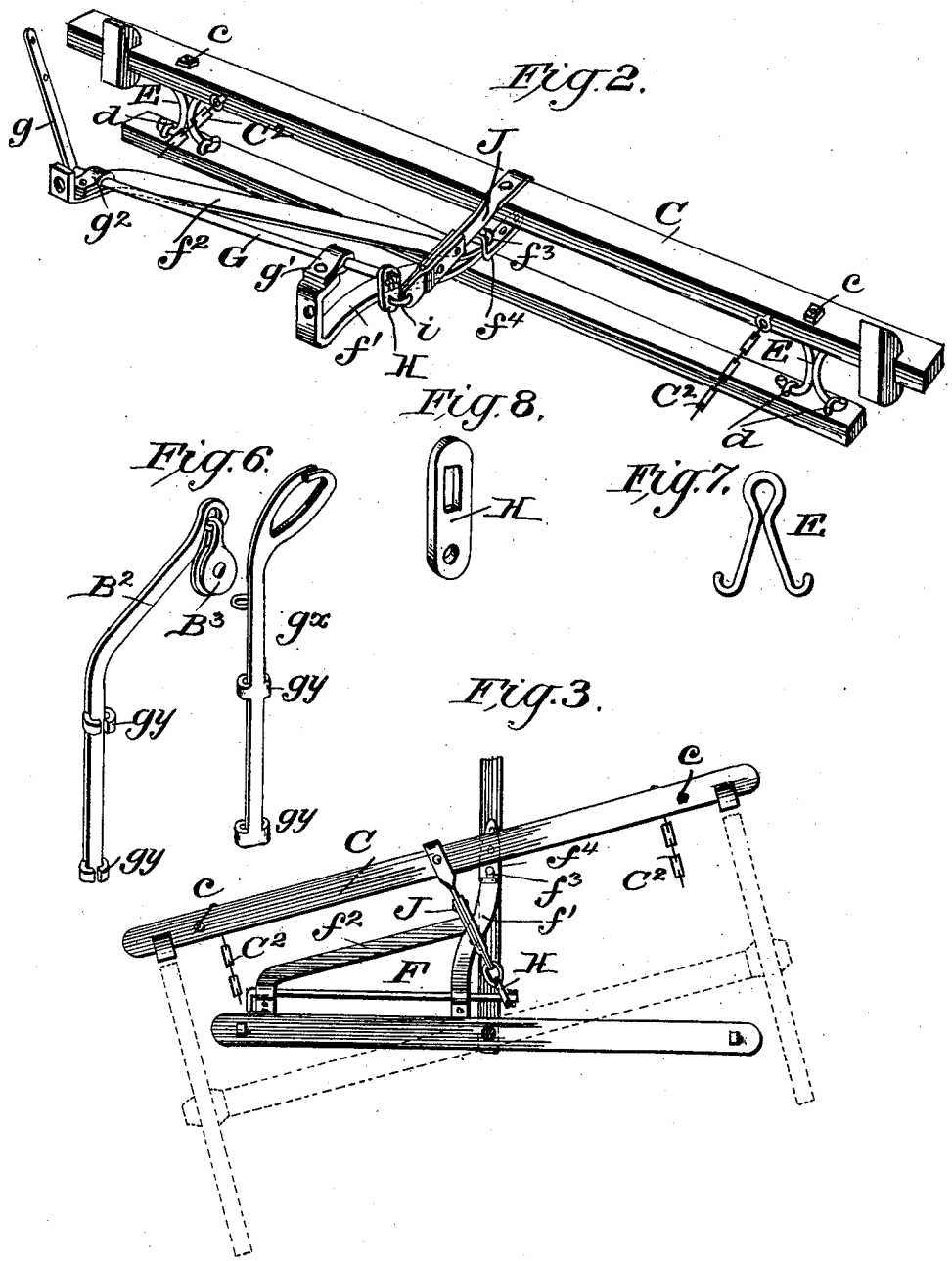

3 SHEETS—SHEET 3.

WITNESSES:
Jos. A. Ryan
J. Middleton

INVENTOR
Gilbert D. Buchanan
BY Munn & Co.
ATTORNEYS

UNITED STATES PATENT OFFICE.

GILBERT D. BUCHANAN, OF SARATOGA, WYOMING.

BRAKE MECHANISM FOR VEHICLES.

No. 819,511.　　　　Specification of Letters Patent.　　　Patented May 1, 1906.

Application filed January 27, 1905. Serial No. 242,976.

*To all whom it may concern:*

Be it known that I, GILBERT D. BUCHANAN, a citizen of the United States, and a resident of Saratoga, in the county of Carbon and State of Wyoming, have invented a new and useful Improvement in Brake Mechanism for Vehicles, of which the following is a specification.

My invention consists in brake mechanism and includes means for applying brakes to the front wheels of a vehicle in addition to brake mechanism employed with the hind wheels thereof, detachable supplementary operating mechanism being provided, adapting the invention to be used either with or without the wagon-body.

An object in connection with others is to provide mechanism adapted when manufactured complete to be readily and reliably attached to any ordinary vehicle of the class for which it is intended and also adapted when thus attached to be connected with rear brake mechanism of the vehicle to be operated simultaneously therewith.

The invention consists in certain novel constructions and combinations of parts, as will be hereinafter described and claimed.

Figure 4:
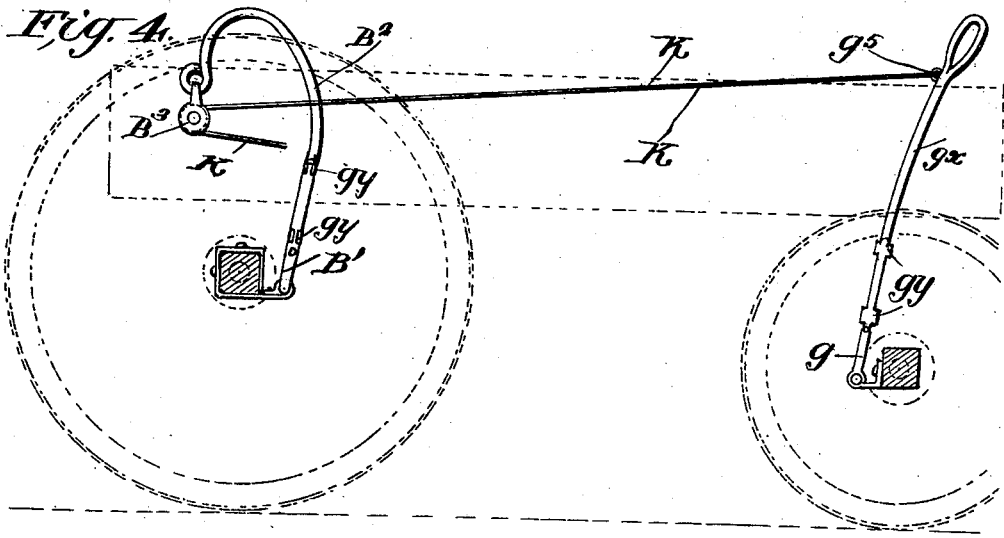
Figure 5:
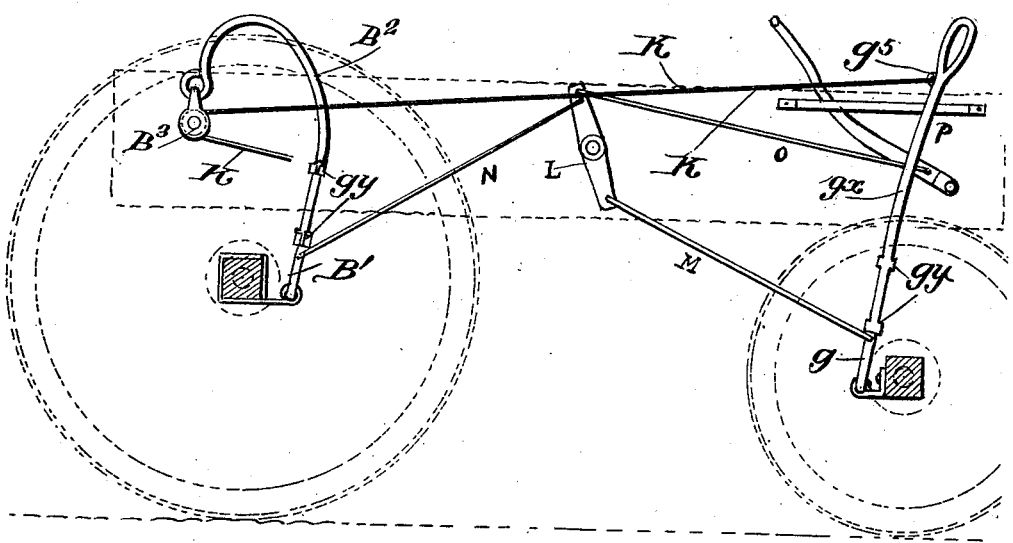

In the drawings, Figure 1 is a top plan view of the running-gear of a wagon with my improved brake mechanism applied thereto. Fig. 2 is a perspective view of parts of my invention shown in their normal position relatively to each other and ready for attachment to a wagon. Fig. 3 is a top plan view of certain parts of my device, showing their relative position to each other when the wagon is making a sharp turn, the bolster of the wagon being shown in full lines and the front wheel and axle being shown in dotted lines, with all other parts of the wagon and some parts of the brake mechanism omitted for the sake of clearness. Fig. 4 is a side elevation of the brake-levers in their operative positions relatively to each other and provided with removable extensions having a flexible connection whereby both levers may be simultaneously operated by a single pull upon said flexible connection. Fig. 5 is a side elevation of certain parts of my invention and illustrates the method of simultaneously operating both brake-levers from the wagon-body, parts of the wagon being shown in dotted lines. Fig. 6 is a perspective view of the brake-lever extensions. Fig. 7 illustrates one of the V-shaped links employed to connect the brake-beam with the hound-bar; and Fig. 8 is a perspective of the front draw-bar crank, showing particularly the elongated slot therein.

The wagon A has the front wheels A' A' and the rear wheels $A^2 A^2$. The rear part of the wagon is provided with brake mechanism operated by the draw-bar B, having at its outer end the upwardly-extending lever portion B'.

The brake mechanism for the front wheels includes the brake-beam C, extending transversely across the top of the wagon-frame at the rear of the front wheels. The hound-bar D is rigidly secured to the under side of the hounds and is disposed parallel with the brake-beam C and slightly in advance thereof, with its ends projecting outwardly from the sides of the hounds. The brake-beam is pivotally connected to the projecting ends of the hound-bar D, Fig. 2, by means of links E, which are preferably V-shaped, (see Fig. 7,) each one being provided with either hooks or eyes at the extremities of its leg-sections and with a loop at its apex, the apex-loops engaging suitable eyebolts $c$ in the brake-beam and the hooks or eyes engaging similar bolts $d$ in the hound-bar. The construction just described permits the brake-beam to rock forwardly and rearwardly on the hound-bar. The stay-chains $C^2 C^2$ loosely connect the ends of the brake-beam with the sand-bar or front axle of the wagon.

The combined bolster-brace and draw-bar support F consists of two branches—a long and a short—extending from a common point or apex. The short branch $f'$ extends nearly in a straight line from said apex, but is slightly offset near its center in the direction of the other branch and terminates at its extreme end in an upwardly-extending return-bend secured to the rear side of the bolster at one side of the king-bolt. The long branch $f^2$, while extending in the same general direction as the branch $f'$, also extends angularly outward therefrom and terminates in an upward bend, which is likewise secured to the bolster near the end thereof. The apex end of the bolster-brace F is provided with a hook $f^3$, which engages an eye in the turned-up forward end of the eye-strap $f^4$, said strap being secured to the coupling-pole underneath the brake-beam C and also forming a wear-plate therefor.

The front draw-bar G, having the upwardly-extending lever $g$, is carried upon the brace member F, said bar being pivotally supported at its inner end by the loop $g'$, secured to the return-bend at the extreme end of the branch $f'$ of said bolster-brace F. The outer end of said draw-bar is pivotally mounted in a loop $g^2$, secured immediately in front of the upward bend at the extremity of the branch $f^2$, the loops being arranged to hold the draw-bar parallel with the bolster.

The inner end of the draw-bar G projects beyond the loop $g'$ and is flattened to receive the crank H, said crank being provided at its upper end with a slot to adapt it to easily fit said flattened end and of a length greater than the width of said end, whereby to permit said crank to rock longitudinally on the draw-bar. The crank H carries at its lower end the link $i$, which in turn connects with the brake-operating bar J, extending forwardly from the center of the brake-beam, said link forming a flexible connection between said crank and bar. The inward offset in the branch $f'$ of the bolster-brace F permits the bar J to incline downwardly from the center of the brake-beam to the crank H without coming into contact with said branch $f'$ when the crank H is located at the center of the bolster. This offset is sufficiently great to permit the inward rocking movement of the crank H when the wagon turns in a direction to cause said movement.

From the foregoing description, taken in connection with the drawings, it will be observed that by moving the front brake-lever $g$ rearwardly the brake mechanism controlled thereby will apply the brakes to the front wheels, while the rear brake-lever B' when moved forwardly in the ordinary way will apply the brakes to the hind wheels I also provide detachable means for simultaneously moving these levers in direction of each other by a single act of the operator, whereby to apply the brakes to all four of the wheels at once.

The front lever $g$ is provided with the extension $g^x$, which has an eye $g^5$, near the upper end thereof, and the loops or clips $g^y$ on one side, near the lower end thereof, adapting the extension to be passed down over the lever in engagement therewith, while the rear lever B' is provided with a similar extension B², being preferably bent rearwardly at its upper end and carrying a loosely-supported pulley B³. A cord K is tied at one end in the eye $g^5$ and is passed over the pulley B³, whereby a pull upon the free end of the cord serves to draw the operating-levers B' and $g$ toward each other, and thereby simultaneously applies both brakes. This cord can be held in the hand of the operator and furnishes easy and convenient means for applying the brakes. It will of course be understood that the pulley B³ and the cord K can be directly attached to the brake-applying levers without the extension members $g^x$ and B².

It will be observed that a pull on the cord K when the wagon-body is off would naturally tend to rotate the bolster on the king-bolt, causing the end thereof carrying the brake-lever to swing rearwardly, thereby compensating in large measure for the movement of the cord and seriously interfering with the braking of the wagon; but this is prevented by the bolster-brace F, which holds the bolster always at right angles to the coupling-pole and parallel with the rear bolster.

When the wagon is caused to make a sharp turn, (see Fig. 3,) the elongated slot in the crank H permits the same to rock longitudinally on the flattened end of the draw-bar G to compensate for the circular movement of the inner end of the brake-operating bar J as it describes the arc of a circle having the king-bolt for its center when the front part of the wagon turns on said bolt relatively to the bolster.

The link $i$, connecting the crank H with the end of the bar J, gives increased flexibility at this point.

In Fig. 5 I illustrate the brake mechanism employed when the wagon-body is used. The double lever L (see Fig. 5) is centrally secured to the side of the wagon-body and provided with two apertures at its upper end and one at its lower end. The aperture at the lower end of the double lever pivotally receives one end of a rod M, the forward end of which rod has pivotal connection with the front brake-lever $g$. Another rod N similarly connects the upper end of the double lever with the rear brake-lever B', while a third rod O connects the upper end of the double lever with an ordinary foot-lever P at the front of the wagon-body. From this construction it will be observed that a forward movement of the foot-lever P will through the double lever L draw the brake-applying levers $g$ and B' in direction of each other, which, as already described, will simultaneously apply all the brakes.

The extension members $g^x$ and B² may, if desired, be removed from the brake-levers when the wagon-body is used; but they operate as effectively when the body is used as when it is dispensed with.

The object of turning the rear lever extension B² rearwardly and the forward extension $g^x$ forwardly, as shown in the drawings, is to adapt them each to move by gravity in a direction to open the brakes when the pull upon the cord K is released. In practice these extensions may be cheaply formed from sections of gas-pipe, which can be bent somewhat flat at one end to slip over the ends of the brake-levers and suitably curved toward their free ends.

For ordinary service the rope and pulley is a great convenience, as the brakes can be controlled thereby when the operator is on the wagon or on foot, and in case of long teams they may be operated from the back of the saddle-horse. Furthermore, in the hauling of long timbers, &c., this arrangement does not in any way interfere with the coupling out of the wagon to any length desired and works equally well under all conditions.

Having thus described my invention, what I claim as new, and desire to secure by Letters Patent, is—

1. A brake-operating mechanism adapted to be applied to the front part of the running-gear of a four-wheeled vehicle and comprising a brake-beam adapted to be disposed transversely of the running-gear of the wagon at the rear of the front wheels, a hound-bar adapted to be secured underneath the hounds of the wagon slightly in advance of the brake-beam, with its ends projecting beyond the sides of the hounds, V-shaped links having loops at their apex ends, and hooks at their other ends, eyebolts in the brake-beam engaging said apex-loops and similar eyebolts in the hound-bar engaging said hooks, stay-chains at the ends of the brake-beam adapted to extend forwardly to connect with the front axle of the wagon, an eye-plate adapted to be secured on the coupling-pole of the wagon underneath the brake-beam with its forward end extending in advance of said beam and bent upwardly and provided with an eye, a bolster-brace having two branches, extending from a common apex, said apex terminating in a hook engaging said eye, one branch of said brace extending forwardly from said apex and slightly offset inwardly about its middle and terminating in an upward return-bend adapted to engage the front bolster at one side of the king-bolt, the other branch of said brace extending forwardly and outwardly to a point near the end of the bolster and turned upward at its extremity, said upwardly-bent portion being also provided with means for engaging the bolster, a bearing-loop secured to the return portion of the bend at the extremity of said first branch and a similar loop secured in front of the upwardly-bent portion at the extremity of the second branch, a draw-bar supported in said loops and having an operating-lever at its outer end adapted to be engaged by auxiliary operating mechanism the inner end of said draw-bar terminating slightly beyond the outer side of said offset portion of the first-named branch of the bolster-brace, and flat at its extremity, a crank having a slot at its upper end easily receiving said flattened end, said slot being of a length greater than the width of said end to permit the crank to rock longitudinally thereupon, a brake-operating bar secured to the center of the brake-beam and extending forwardly in direction of said crank and a link connecting said bar and crank.

2. The combination with the running-gear of a four-wheeled vehicle of brake mechanism for the front wheels thereof, said mechanism comprising a brake-beam at the rear of the front wheels, flexible connections between the ends of the brake-beam and the hounds of the wagon to prevent undue upward movement of said beam when the brakes are applied, flexible connections between the ends of the brake-beam and front axle of the wagon, a draw-bar supported upon the front bolster, a brace for holding said bolster and draw-bar approximately at right angles to the coupling-pole, a crank on said draw-bar approximately at the transverse center of the wagon, a flexible connection between the center of the brake-beam and said crank, and a lever for applying power to the draw-bar.

3. The combination with the running-gear of a four-wheeled wagon having rear braking mechanism of additional braking mechanism comprising a brake-beam suitably supported at the rear of the front wheels of the wagon, a draw-bar supported by the front bolster and provided with an operating-lever, a crank longitudinally rockable on said draw-bar, a brake-bar extending from the brake-beam in direction of said crank, a flexible connection between the free end of the crank and said brake-bar, a bolster-brace for holding the draw-bar approximately at right angles to the coupling-pole, and detachable auxiliary operating mechanism adapted to connect the front and rear operating-levers to operate both cranks simultaneously.

4. The combination with the running-gear of a four-wheeled wagon having rear braking mechanism of additional braking mechanism comprising a brake-beam suitably supported at the rear of the front wheels of the wagon, a draw-bar supported by the front bolster and provided with an operating-lever, a crank longitudinally rockable on said draw-bar, a brake-bar extending from the brake-beam in direction of said crank, a flexible connection between the free end of the crank and said brake-bar, a bolster-brace for holding the draw-bar approximately at right angles to the coupling-pole, and detachable auxiliary operating mechanism comprising extension members having means at their lower ends for ready attachment to the front and rear operating-levers, the member attached to the front operating-lever having an eye near its upper end, the extension member for the rear brake-lever having its upper end bent rearwardly and provided with a pulley and a flexible connection secured to the eye in the front extension member and passing over said pulley, whereby a pull on said cord draws both levers toward each other to apply the brakes.

5. The combination with the running-gear of a four-wheeled wagon having rear braking mechanism of additional braking mechanism comprising a brake-beam suitably supported at the rear of the front wheels of the wagon, a draw-bar supported by the front bolster and provided with an operating-lever, a crank longitudinally rockable on said draw-bar, a brake-bar extending from the brake-beam in direction of said crank, a flexible connection between the free end of the crank and said brake-bar, a bolster-brace for holding the draw-bar approximately at right angles to the coupling-pole, and detachable auxiliary operating mechanism comprising a double-acting lever secured at its center to the wagon-body, a rod extending from the ordinary foot-lever at the front of the wagon-body to said double-acting lever to operate the same, a second rod extending from the upper end of said double-acting lever to the operating-lever of the rear brake, and a third rod extending from the lower end of the double-acting lever to the operating-lever of the front brake, whereby a single movement of the foot-lever operates both brakes.

6. The combination with the running-gear of a four-wheeled wagon having rear braking mechanism of additional braking mechanism comprising a brake-beam suitably supported at the rear of the front wheels of the wagon, a draw-bar supported by the front bolster and provided with an operating-lever, a crank longitudinally rockable on said draw-bar, a brake-bar extending from the brake-beam in direction of said crank, a flexible connection between the free end of the crank and said brake-bar, a bolster-brace for holding the draw-bar approximately at right angles to the coupling-pole, and detachable auxiliary operating mechanism comprising a pulley secured to one of the brake-applying levers, a flexible connection secured to the other brake-applying lever and passing over said pulley, a double-acting lever secured at its center to the wagon-body, a foot-lever at the front of the wagon-body, a rod extending from said foot-lever to said double-acting lever to operate the same, a second rod extending from the upper end of said double-acting lever to the operating-lever of the rear brake, and a third rod extending from the lower end of the double-acting lever to the operating-lever of the front brake.

7. The combination with the front and rear wheels of front and rear brake mechanism, the front brake mechanism comprising a draw-bar held approximately at right angles to the coupling-pole of the wagon, a crank longitudinally rockable on said bar but held against rotation thereon, and located about midway of the front part of the wagon, a brake-operating bar extending from the middle of the brake-beam toward said crank, and a flexible connection between said bar and the free end of said crank.

8. The combination with the running-gear of a four-wheeled vehicle of front brake mechanism comprising a brake-beam, a draw-bar, a crank longitudinally rockable on said draw-bar but held against rotation thereon, and a brake-operating bar extending from the brake-beam and pivotally connected to the free end of said rockable crank.

9. The combination of the front bolster, the hounds, the perch-pole, the brake-beam above the hounds, drag-chains at the ends of said beam, intermediate devices between the ends of the brake-beam and the hounds, a bolster-brace comprising a bracket secured to the bolster and extended rearwardly therefrom and secured to the pole, and a brake-setting shaft journaled to the bracket and connected with the brake-beam and arranged for operation substantially as described.

GILBERT D. BUCHANAN.

Witnesses:
A. B. BUCHANAN,
F. M. BAKER.